United States Patent [19]

Gross et al.

[11] Patent Number: 5,135,799
[45] Date of Patent: Aug. 4, 1992

[54] LAMINATES WITH STABLE ATTACHMENT AREAS

[75] Inventors: Bernd Gross, Grossniedesheim; Heinz Weber, Gruenstadt, both of Fed. Rep. of Germany

[73] Assignee: BASF Aktiengesellschaft, Ludwigshafen, Fed. Rep. of Germany

[21] Appl. No.: 655,825

[22] Filed: Feb. 15, 1991

[30] Foreign Application Priority Data

Feb. 15, 1990 [DE] Fed. Rep. of Germany ....... 4040599

[51] Int. Cl.$^5$ .............................................. B32B 3/26
[52] U.S. Cl. .................................... 428/215; 428/116; 428/117; 428/119; 428/316.6; 428/318.6; 428/319.3; 428/319.7; 428/473.5
[58] Field of Search ............... 428/116, 117, 119, 213, 428/215, 318.6, 319.3, 319.7, 473.5, 316.6

[56] References Cited

U.S. PATENT DOCUMENTS

| | | | |
|---|---|---|---|
| 3,484,335 | 12/1969 | Wismer et al. | 428/116 |
| 4,265,688 | 5/1981 | Gorski | 428/117 |
| 4,885,206 | 12/1989 | Graalmann et al. | 428/473.5 |
| 4,889,763 | 12/1989 | Brambach | 428/473.5 |
| 4,940,629 | 7/1990 | Weber et al. | 428/213 |

FOREIGN PATENT DOCUMENTS

0313171 4/1989 European Pat. Off. .
1467766 3/1977 United Kingdom ................ 428/119

*Primary Examiner*—William J. Van Balen
*Attorney, Agent, or Firm*—Oblon, Spivak, McClelland, Maier & Neustadt

[57] ABSTRACT

Laminates with stable attachment areas have a foam or honeycomb core layer A comprising a heat resistant plastic and cover layers B comprising fiber reinforced heat resistant plastic, the core layer having at least one foam insert C of a heat resistant thermoplastic material whose density is higher than the density of the core.

2 Claims, No Drawings

LAMINATES WITH STABLE ATTACHMENT AREAS

The present invention relates to laminates formed from a foam or honey comb core layer of a heat resistant plastic and at least one cover layer of a fiber reinforced heat resistant plastic.

Sandwich composite elements or laminate sheets with a foam core and fiber reinforced cover layers are known, for example from EP-A-313,171. They find utility in particular as structural elements in the interiors of aircraft. The problem with such structural components is the low stability of the areas where fastening elements, e.g. bolts or metal fittings, are attached.

It is an object of the present invention to improve the strength of the core to such an extent that the fastening elements resist the stresses.

We have found that this object is achieved according to the present invention when the core layer is reinforced with at least one foam insert of higher density composed of a heat resistant plastic.

The present invention accordingly provides a laminate having stable attachment areas, formed from A. a foam or honeycomb core layer from 30 to 150 kg $\cdot m^{-3}$ in density composed of a heat resistant thermoplastic or thermoset material a, B. at least one cover layer composed of a fiber reinforced heat resistant thermoplastic or thermoset or thermoset material b, wherein the core layer has at least one foam insert C from 200 to 1000 kg $\cdot m^{-3}$ in density composed of a heat resistant thermoplastic material c.

The foam or honeycomb core layer A has a density of from 30 to 150, preferably from 40 to 80, kg $\cdot m^{-3}$. It consists of a heat resistant plastic a. Preference is given to foam core layers made of thermoplastics, in particular polyether sulfones

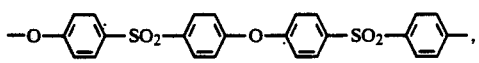

polysulfones

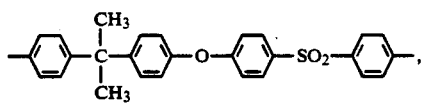

polyether imides

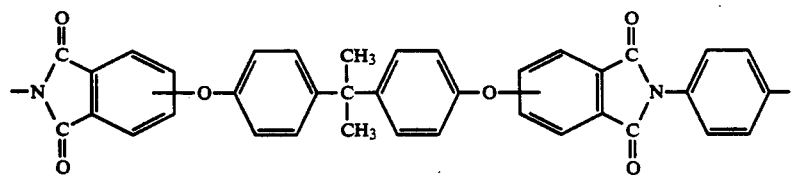

and polyamides, e.g. nylon 6, nylon 6.6, nylon 4.6 and (partly) aromatic polyamides.

Besides these it is also possible to use thermoplastic polyimides, polyimides, polyether imides, polycarbonate, polyphenylene sulfide and polyphenylene ethers, and copolymers and mixtures thereof. Suitable thermosetting plastics are for example epoxy resins and phenol/formaldehyde and melamine/formaldehyde resins.

The core layer may also have a honeycomb structure and be made of a phenolic-impregnated aromatic polyamide.

The plastics should have a DIN 53 461 (B) heat resistance of more than 130° C., preferably more than 160° C.

The core layer is preferably from 4 to 40 mm, in particular from 5 to 20 mm, in thickness.

The fiber reinforced cover layer B is unfoamed. Suitable plastics are the same thermoplastics and thermosets b as for the core layer. Suitable fibers are those made of glass, carbon and aromatic polyamide. The fibers may be in the form of weaves, knits, mats or unidirectional bundles. Preference is given to woven glass fiber fabrics. The resin content is in general in the range from 20 to 60% by weight.

The thickness of the cover layer is preferably from 0.1 to 1.5 mm, in particular from 0.2 to 0.6 mm.

According to the present invention the core layer has at least one foam insert C of higher density composed of a heat resistant thermoplastic material c. Suitable thermoplastics for this purpose are the same as for a; preference is given to using thermoplastics of the same type. The density of the insert is comparatively high to ensure firm attachment of the fastening elements. It ranges from 200 to 1000 kg $\cdot m^{-3}$, preferably 300 to 800 kg $\cdot m^{-3}$. The insert C may have any desired shape. In general, it will be circular, but it may also have an oval, rectangular or nonregular shape. It may fill out the entire thickness of the core layer of else only a proportion thereof. Depending on the load to be absorbed by the fastening elements, its diameter is from 0.5 to 10 cm, measured on the surface of the core layer.

In principle, the insert C can be joined to the edge of the core layer A by welding or adhering. Preferably, however, the thermoplastic c is employed in the expandable, unfoamed state-still containing a blowing agent—in the form of a platelet or granular product, produced for example as described in DE-A-39 25 740 by extruding granules which contain a blowing agent. Preferred blowing agents are low-boiling liquids which at most have a swelling but not a dissolving effect on the thermoplastic, preferably in amounts of from 1 to 20, in particular from 2 to 10, % by weight. suitable blowing agents are for example halogenated hydrocarbons, such as dichloromethane and chlorobenzene, ketones, such as acetone and methyl ethyl ketone, ethers alcohols, water and mixtures thereof. In principle, it is also possible to use chemical blowing agents, such as azo compounds and carbonates.

The insert C can be introduced into the core layer A in various ways. For example, a hole may be drilled or punched into the core layer, or a hollow may be mill-cut. The expandable granular or platelet product is then introduced into this hole or hollow. It is also possible to dispense with a hollow and simply to press a platelet into the foamy core layer. If the core layer has a honeycomb structure, the granules may be introduced into the cavities of the honeycombs.

Then the cover layer B is applied, which may be done, in particular in the case of thermosetting cover layers, by placing an adhesive film in between. This assembly is then press-molded at a temperature at which the insert C softens and the flowing agent becomes vaporized. Advantage is taken here of the effect that the glass transition temperature of the thermoplastic c is dramatically reduced by the blowing agent, in the case of polyether sulfone for example from about 225° C. to below 100° C. Thus, the thermoplastic a does not become soft at the press-molding temperature, so that the structure of the foamy core layer remains intact or is at most softened at the points of contact with the expanding insert. In the case of cover layers made of a thermosetting plastic b, the press-molding temperature should be above the curing temperature of the latter.

The expanding insert C thus penetrates into the core layer A and becomes attached therein. At the same time, the cover layer B becomes joined to the core layer A, possibly via an adhesive film, and a thermosetting plastic b will harden.

The pressing may be combined with a shaping of the laminate, so that it may be not only planar but also vaulted, arcuate or curved and may also differ in thickness in various areas.

The expanded insert C may be fitted out with self-cutting thread bushings or chipboard bolts. Similarly, it may be fitted out with the widely used thread inserts for thermoplastics by warm embedding or ultrasonic welding-in. Pullout strengths of $>1000N$ are achieved.

The laminates according to the present invention are suitable for use as structural components for the interiors of aircraft, in particular for partition walls, storage compartments or flaps for hat rests, in automotive engineering and shipbuilding, and in domestic appliances.

In the Examples, the parts and percentages are by weight.

EXAMPLE 1

A mold with internal dimensions $300\times300\times10$ mm, made of a base plate and a detachable frame, is entered from the top with a 0.3 mm thick cover layer, $300\times300$ mm, comprising a glass fabric (basis weight 296 g $\cdot m^{-2}$) impregnated with 30% of polysulfone. On top is placed a polyether sulfone foam (density 50 kg $\cdot m^{-3}$, dimensions $295\times295\times11$ mm). The foam has a hole 40 mm in diameter punched out in the middle. A platelet of expandable polyether sulfone (containing 12% of 2-butanone as blowing agent) 40 mm in diameter and 3.5 mm in thickness is placed into this hole. A cover layer as described above is placed on top of the foam core. The assembly is introduced into a press and press-molded at 200° C. for 5 minutes, in the course of which the platelet softens, expands and becomes attached to the core layer. At this same time, the cover layer softens and likewise becomes joined to the core layer. Cooling down leaves a planar composite plate whose hole in the middle has been foamed out with an insert about 450 kg $\cdot m^{-3}$ in density. This insert exhibits a high bolt pullout resistance.

EXAMPLE 2

The mold described in Example 1 has placed on top of it a glass fabric (296 g $\cdot m^{-2}$) $350\times350$ mm in size impregnated with 50% by weight of uncured phenolic resin. This prepreg is pressed against the base and the inner side surfaces of the mold. Then a sheet of polyether sulfone foam (density 50 kg $\cdot m^{-3}$) $300\times300\times11$ mm in size with a hole 25 mm in diameter in the middle is introduced. This hole is filled with expandable polyether sulfone granules (containing 12% of 2-butanone as blowing agent). The whole is covered with a cover layer as described above. The assembly is introduced into a press and press-molded at 150° C. for 20 minutes, in the course of which the granules soften and expand into a foam which becomes attached to the core layer. The tacky phenolic resin cover layer likewise becomes joined to the core layer and at the same time the phenolic resin undergoes curing.

Cooling down leaves a planar composite sheet with an insert of a density of about 550 kg/m³ in the middle. A chipboard bolt (nominal diameter 4 mm) is screwed into the center of the insert to a depth of 9 mm. The bolt pullout force is about 1100N.

EXAMPLE 3

Example 2 is repeated, except that no hole is punched out and instead a platelet of expandable polyether sulfone 40 mm in diameter and 2.5 mm in thickness is placed on top before the upper cover layer is applied. Press molding and cooling gives a composite sheet with an increased density of about 500 kg/m³ in the reinforced areas of the core.

EXAMPLE 4

Example 2 is repeated, except that the core layer used is a honeycomb structure of phenolic-impregnated polyamide. The honeycomb cavities are filled to a diameter of about 30 mm with expandable polyether sulfone granules each weighing about 20 mg. After press-molding and cooling, the honeycomb has been foamed out in the filled areas to a density of about 400 kg/m³.

We claim:

1. A laminate having stable attachment areas, formed from
   (A) a foam layer of from 30 to 150 kg·m⁻³ in density composed of a thermoplastic polyether sulfone or polysulfone,
   (B) at least one cover layer composed of a fiber reinforced heat resistant thermoplastic or thermoset material,
   (C) at least one foam insert, in said foam layer, of from 200 to 1000 kg·m⁻³ in density composed of a thermoplastic polyether sulfone or polysulfone.

2. The laminate as claimed in claim 1, wherein said foam layer is from 4 to 40 mm in thickness, said cover layer is from 0.1 to 1.5 mm in thickness, and said at least one foam insert is from 0.5 to 10 cm in diameter.

* * * * *